US006994814B2

(12) United States Patent
Moriguchi et al.

(10) Patent No.: US 6,994,814 B2
(45) Date of Patent: Feb. 7, 2006

(54) METHOD FOR MANUFACTURING INJECTION-MOLDED FOAMED ARTICLE

(75) Inventors: Tsuyoshi Moriguchi, Marugame (JP); Makoto Nagata, Ichihara (JP); Masaaki Tsutsubuchi, Chiba (JP); Takashi Fujimoto, Sodegaura (JP)

(73) Assignee: Sumitomo Chemical Company, Limited, Osaka (JP)

( * ) Notice: Subject to any disclaimer, the term of this patent is extended or adjusted under 35 U.S.C. 154(b) by 390 days.

(21) Appl. No.: 10/298,941

(22) Filed: Nov. 19, 2002

(65) Prior Publication Data

US 2003/0127764 A1 Jul. 10, 2003

(30) Foreign Application Priority Data

Nov. 22, 2001 (JP) ............................ 2001-357361
Nov. 22, 2001 (JP) ............................ 2001-357362
Feb. 5, 2002 (JP) ............................ 2002-027914

(51) Int. Cl.
*B29C 44/02* (2006.01)

(52) U.S. Cl. .......................................... 264/54; 264/51

(58) Field of Classification Search .................. 264/51, 264/54

See application file for complete search history.

(56) References Cited

U.S. PATENT DOCUMENTS 4,830,798 A * 5/1989 Maeda ........................ 264/50
5,124,095 A * 6/1992 Gianni et al. .............. 264/45.5
5,252,269 A * 10/1993 Hara et al. ................ 264/45.3
5,281,376 A * 1/1994 Hara et al. ................ 264/46.4
5,551,673 A * 9/1996 Furusawa et al. ........... 267/160
5,824,759 A * 10/1998 Watanabe et al. ........... 526/348
5,928,776 A * 7/1999 Shioya et al. ............ 428/316.6

FOREIGN PATENT DOCUMENTS

JP 5-269778 A 10/1993

* cited by examiner

*Primary Examiner*—Allan R. Kuhns
(74) *Attorney, Agent, or Firm*—Sughrue Mion, PLLC

(57) ABSTRACT

Disclosed is a method for manufacturing an injection-molded foamed article, the method comprising the steps of:

melt-kneading a thermoplastic resin and a chemical foaming agent in a cylinder of an injection unit, injecting the melt-kneaded thermoplastic resin from the cylinder into a cavity of a mold, and cooling and solidifying the thermoplastic resin injected in the cavity, wherein at least one of conditions (1) and (2) given below is satisfied:

$$M_p+35° \text{ C.} \leqq T \leqq M_p+115° \text{ C. and } \gamma \geqq 1800 \text{ sec}^{-1} \quad (1)$$

wherein $M_p$ denotes the melting point (° C.) of the thermoplastic resin, T denotes the molding temperature (° C.) and γ denotes the shear rate ($\text{sec}^{-1}$) of the thermoplastic resin during its filling into the cavity at the molding temperature T;

$$T_m \geqq M_p-105° \text{ C.} \quad (2)$$

wherein $T_m$ denotes a mold temperature (° C.), and $M_p$ has the same meaning as above.

5 Claims, 1 Drawing Sheet

METHOD FOR MANUFACTURING INJECTION-MOLDED FOAMED ARTICLE

BACKGROUND OF THE INVENTION

1. Field of the Invention

The present invention relates to a technology for preventing the occurrence of sink marks and silver streaks in injection foam molding of a thermoplastic resin.

2. Description of the related art

In injection foam molding of a thermoplastic resin, molding conducted under ordinary conditions results in formation of silver-white streaks called silver streaks on the surface of the resulting molded article. Therefore, such conventional ordinary injection foam molding is not suitable for the production of products required to have a good appearance, such as interior parts of automobiles. There is known a method of setting the temperature of a cylinder of an injection machine to be low in order to avoid the formation of silver streaks. However, too low a temperature may result in insufficient foaming.

SUMMARY OF THE INVENTION

The object of the present invention is to provide a method for manufacturing an injection-molded foamed article by injection foam molding without forming sink marks and silver streaks.

The present inventors considered that in injection foam molding silver streaks are formed when foams formed near the forefront of a flowing resin are rubbed on a mold wall. Therefore, the present inventors considered that silver streaks once formed will eventually become unnoticeable if, when the foams formed inside the resin have reached a mold wall, the temperature of the resin in contact with the mold wall is high enough or the temperature of the mold wall is high enough. Consequently, the present inventors considered that means effective for preventing generation of silver streaks during injection foam molding is (1) to make the temperature of the resin in contact with a mold wall be high by shear heat generation on the mold wall through high-speed feed of a molten resin into a cavity or (2) to make the mold temperature high during the filling of a molten thermoplastic resin. Based on such a hypothesis, the present inventors have reached the invention described below.

The present invention provides a method for manufacturing an injection-molded foamed article, the method comprising the steps of:

melt-kneading a thermoplastic resin and a chemical foaming agent in a cylinder of an injection unit, injecting the melt-kneaded thermoplastic resin from the cylinder into a cavity of a mold, and cooling and solidifying the thermoplastic resin injected in the cavity, wherein at least one of conditions (1) and (2) given below is satisfied:

$$M_p+35° \text{ C.} \leqq T \leqq M_p+115° \text{ C. and } \gamma \geqq 1800 \text{ sec}^{-1} \quad (1)$$

wherein $M_p$ denotes the melting point (° C.) of the thermoplastic resin, T denotes the molding temperature (° C.) and $\gamma$ denotes the shear rate. ($sec^{-1}$) of the thermoplastic resin during its filling into the cavity at the molding temperature T;

$$T_m \geqq M_p-105° \text{ C.} \quad (2)$$

wherein $T_m$ denotes a mold temperature (° C.), and $M_p$ has the same meaning as above.

In the following description, thermoplastic resin may simply be called resin.

DESCRIPTION OF PREFERRED EMBODIMENTS

Figure 1:
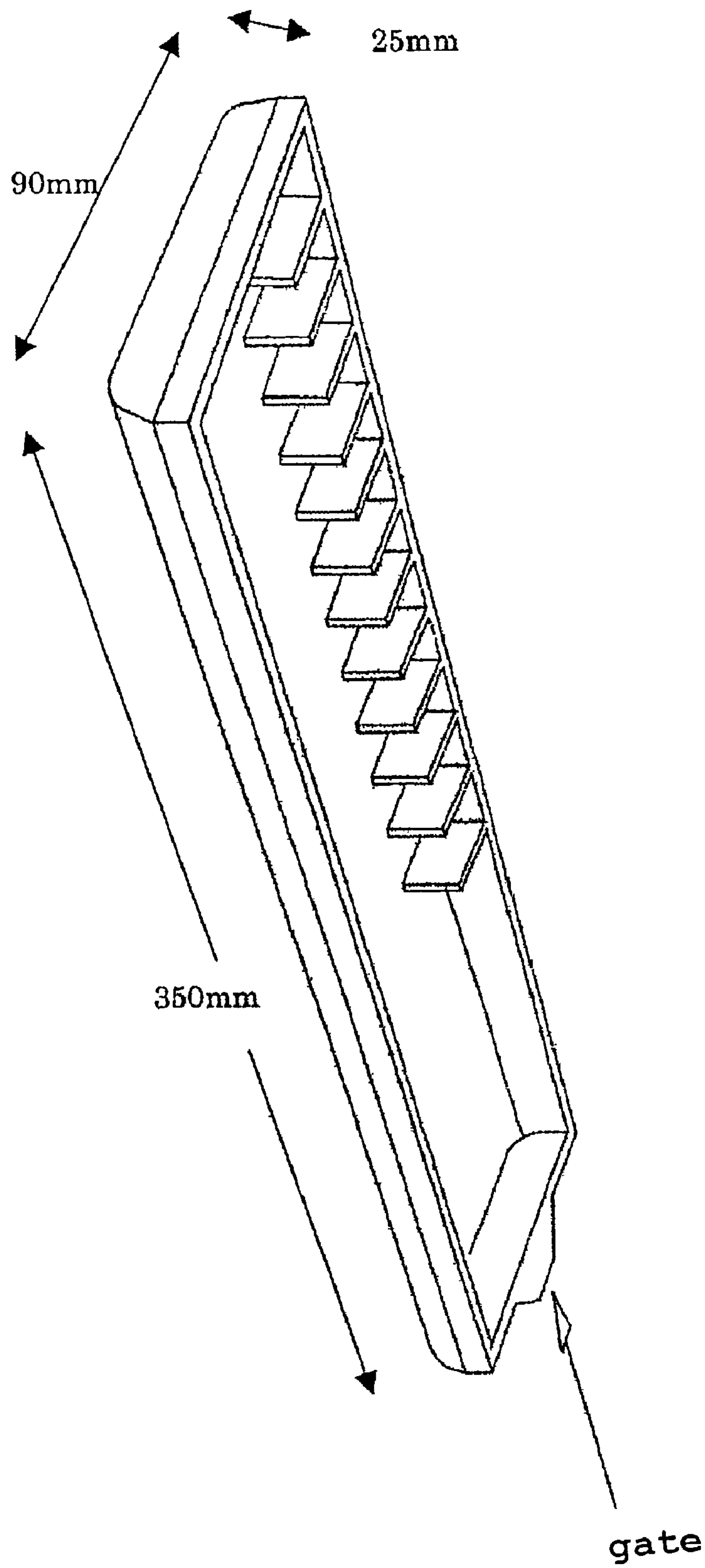
FIG. 1 illustrates the shape of the injection-molded foamed articles manufactured in the Examples.

A first embodiment of the present invention is one in which injection foam molding is conducted under condition (1) described above.

In the present invention, the molding temperature means the temperature of a molten resin right before it is injected into a cavity of a mold. The molding temperature is determined by measuring the temperature of a molten resin right after it is injected from a cylinder using a thermocouple thermometer. The molding temperature is controlled by a method comprising controlling the temperature of the cylinder of the injection unit, the screw rotation speed and back pressure of the injection machine during a plasticizing step. If the molding temperature is too low, the viscosity of the resin will increase too much, resulting in difficulty of foaming. If the molding temperature is too high, foams will break easily. It is preferable that $M_p+55° \text{ C.} \leqq T \leqq M_p+95° \text{ C.}$ Needless to say, the molding temperature is not lower than the melting point ($M_p$) of the resin.

In the first embodiment of the present invention, the molten resin is filled into the cavity at a high speed. In other words, the filling of the resin is performed so that $\gamma \geqq 1800$ $sec^{-1}$, preferably 1900 $sec^{-1} \leqq \gamma \leqq 4000$ $sec^{-1}$, and more preferably 2000 $sec^{-1} \leqq \gamma \leqq 3000$ $sec^{-1}$.

The shear rate, $\gamma$, is the shear rate ($sec^{-1}$) of the molten resin injected into the mold cavity at a molding temperature T, in the cavity. If there is a shear rate distribution inside the resin filled into the cavity, the minimum value of shear rate is used as $\gamma$.

The shear rate may be determined by a known method and can be determined, for example, by simulation using the finite element method described in Avraam I. Isayev, "Injection and Compression Molding Fundamentals", Marcel Dekker, Inc., 44–61, 1987.

If the cavity has rectangle sections perpendicular to the flow direction of the resin and all the sections are the same with each other, the shear rate can be determined from the following formula using dimensions of the sections (the width W (cm) and the height H (cm) and an injection rate Q ($cm^3$/sec):

$$\gamma=6Q\div(W\times H^2)$$

$\eta$ (Pa·sec) is the melt viscosity of a resin at the time of its molding and is determined with a capillary rheometer at a temperature of T and a shear rate of $\gamma$.

Additionally, the share rate of $\gamma$ can be controlled by a setting of a molding temperature and an injection speed at the time of injection molding.

A second embodiment of the present invention is an embodiment in which injection foam molding is carried out by use of a mold of high temperature. Specifically, the injection foam molding is carried out under such conditions that $T_m \geqq M_p-105°$ C. wherein $T_m$ denotes the mold temperature (° C.) and $M_p$ denotes the melting point (° C.) of the resin.

In this embodiment, there is no need to make the mold temperature of the entire mold satisfy the formula $T_m \geqq M_p - 105°$ C. It is only required that a part of the mold where you wish to prevent the formation of silver streaks is made have a mold temperature satisfying $T_m \geqq M_p - 105°$ C. The mold temperature preferably satisfies $T_m \geqq M_p - 85°$ C. A temperature not higher than the melting point of the resin to be used is selected as the mold temperature.

The mold temperature used herein means a temperature of a mold wall which defines the cavity and is usually measured by bringing a contact type thermocouple thermometer into contact with the mold wall after fifteen shots continuously molded from the beginning of molding.

In the practice of the method of the present invention, the mold and the injection molding apparatus are not required to have any new equipment or additional mechanism. However, it is preferable to make products have a thickness of 2 mm or more, as required, for the purpose of further reduction of weight of the products. The thickness used herein indicates the thickness of a portion which is perpendicular to the mold clamping direction and which occupies most of the product.

For improving the expansion ratio, it is also possible to use a processing method in which the capacity of the cavity is increased through the movement of the mold after the feed of the resin. In this case, the thickness mentioned above indicates the thickness before the movement of the mold is commenced.

The amount of the resin to be injected in the method of the present invention is preferably such an amount that the entire cavity is filled with a resin right after the finish of the injection of the resin.

The method of the present invention is suitable not only for the production of injection molded articles having ribs which is liable to formation of sink marks, but also for the production of various injection molded articles in which sink marks are formed.

The injection-molded foamed article of the present invention is an injection-molded foamed article manufactured by the method described above, in which injection-molded article sink marks and silver streaks are improved. Preferred embodiments of the injection-molded foamed article of the present invention include an injection-molded foamed article with ribs.

The injection-molded foamed article of the present invention has a reduced weight and preferably has an expansion ratio of more than 1 time and not more than 5 times, more preferably from 1.05 time to 3 times.

The thermoplastic resin to be used in the present invention is not particularly restricted and is exemplified by olefin-based resins, styrene-based resins, acrylic resins and amide resins. Preferably employed are olefin-based resins. Examples of the olefin-based resins include homopolymers of α-olefin having not more than 20 carbon atoms such as ethylene, propylene, butene-1, pentene-1, hexene-1, 3-methylbutene-1, 4-methylpentene-1, etc., copolymers resulting from copolymerization of at least two kinds of monomers selected from the foregoing α-olefins, and copolymers of those α-olefins and unsaturated monomers polymerizable with those α-olefins.

Of the olefin-based resins, preferably employed are polypropylene resins. Polypropylene resins preferably used in the present invention include (1) homopolymer of propylene or (2) copolymer of propylene and at least one kind of monomer selected from the group consisting of ethylene and α-olefins having from 4 to 12 carbon atoms, the copolymer containing at least 50% by weight of repeating units derived from propylene, which may henceforth be referred to as "propylene units," based on 100% by weight of the copolymer. These homopolymer or copolymer may be used singly or in combination of two or more kinds of them.

The flexibility and impact resistance of the copolymer can be controlled through choice of the amount of repeating units derived from ethylene or α-olefin having from 4 to 12 carbon atoms. The α-olefin is exemplified by 1-butene, 4-methyl-1-pentene, 1-hexene and 1-octene.

If a copolymer has two or more kinds of repeating units other than propylene units, the total amounts of the repeating units other than propylene units is preferably not more than 35% by weight.

Specific examples of preferred polypropylene resin include (i) a homopolymer of propylene, (ii) a random copolymer of propylene and ethylene, (iii) a random copolymer of propylene and α-olefin, (iv) a random copolymer of propylene, ethylene and α-olefin, and (v) a block copolymer propylene and ethylene. The polypropylene resin preferably has a melt flow rate (MFR), measured in accordance with JIS K6758, of from 1 to 30 g/10 min.

To the method of the present invention, resins which generate a great amount of heat by shear during molding are suitably applied. Namely, preferred is an embodiment carried out so that condition (3) given below is satisfied:

$$150° \text{ C.} \leqq M_p \leqq 180° \text{ C. and } \eta \times \gamma^2 \times 10^{-6} + 2T \geqq 560 \qquad [*](3)$$

wherein $M_p$, T and γ have the same meanings as above and η denotes the melt viscosity (Pa·sec) of the thermoplastic resin at the molding temperature T. The method of determination of γ is the same as that described previously.

The left term of the formula [*] above, $\eta \times \gamma^2 33\ 10^{-6} + 2T$, indicates the degree of temperature rise of the resin flowing in the cavity near the mold wall caused by shear heat generation. Namely, the temperature of the resin near the mold wall increases due to shear heat generation when the shear rate γ is large, when the viscosity η of the resin at the shear rate γ is large, and when the molding temperature T is high. The higher the temperature of the resin near the mold wall, the better the appearance of a molded article. The value of the left term of the formula [*] above is preferably not less than 560, and particularly preferably not less than 600.

In the present invention, only one kind of thermoplastic resin may be used as the thermoplastic resin, or alternatively, two or more kinds of thermoplastic resins may be used. When two or more kinds of thermoplastic resins are used, it is desirable that the amount of propylene resins accounts for 50% by weight or more of the whole thermoplastic resin.

The chemical foaming agent used in the present invention is not particularly restricted as long as it is a chemical foaming agent that is used for injection foam molding of a thermoplastic resin. Examples thereof include organic chemical foaming agents typified by citric acid and ADCA type chemical foaming agents; and inorganic chemical foaming agents typified by sodium bicarbonate. The latter is preferred from the viewpoint of prevention of mold pollution. In the present invention, two or more kinds of foaming agents can be used in combination.

Since those chemical foaming agents generate a gas in an amount which varies depending upon the resin temperature at the time of molding, it is difficult to provide a general amount of those agents to be used. They may be added in an amount suited to the expansion ratio of a final product.

EXAMPLES

The present invention will be described with reference to examples, but the present invention is not limited to these examples.

Evaluation methods used in Examples and Comparative Examples are described below.

(1) Melt Flow Rate (MFR)

The MFR of a resin was measured at a temperature of 230° C. and a load of 21.18 N in accordance with JIS K6758.

(2) Product Appearance (Judge of Silver Streak)

The degree of silver streaks was evaluated visually and sensorily.

○: No silver streaks were found for all the sites in the surface of a molded article.

x: Silver streaks were found in at least site of the surface of a molded article.

(3) Sink Mark

The degree of sink marks in the side opposite to ribs was evaluated visually and sensorily.

○: No sink marks were found for all the ribs.

Δ: A sink mark was found for at least one rib.

x: A large sink mark was found for at least one rib.

(4) Weight

The molded articles were weighed with a platform scale.

Materials used in Examples and Comparative Examples are as follows.

(2) Master Batch of Foaming Agent

An inorganic chemical foaming agent (MB3062 manufactured by SANKYO Chemical Co., Ltd.) was used.

(3) Master Batch of Pigment

Black SPEM-8H102HCAN manufactured by SUMIKA COLOR CO., LTD. was used.

In the Examples and Comparative Examples of Series 1 and 2, a propylene-ethylene block copolymer (Sumitomo Noblene AZ161C manufactured by Sumitomo Chemical Co., Ltd.; melting point ($M_p$) =164° C.; melt flow rate=30 g/10 min) was used.

[Series 1]

In each of the Examples and Comparative Example shown below, IS650E (manufactured by TOSHIBA MACHINE Co., Ltd.; using a shut-off nozzle) was used as an injection-molding machine and an injection-molded article (350 mm by 90 mm by 25 mm) illustrated in FIG. 1 was obtained. The portions other than ribs had a thickness of 3.0 mm. The thickness of the ribs was 1.4 mm at their roots and 1.0 mm at their tips. The height of the ribs was 25 mm. Each product had a width of 12.5 cm and thickness of 0.3 cm at its portion other than the ribs when being cut along a section of the mold cavity perpendicular to the flow direction. Letting Q ($cm^3$/sec) denotes the injection rate, the shear rate was $6\times Q\div(12.5\times 0.3^2)=5.33\times Q$ ($sec^{-1}$)

Example 1

Polypropylene resin, a master batch of a foaming agent and a master batch of a pigment were dry-blended in a blend ratio of 100/2.0/0.5 (parts by weight/parts by weight/part by weight). The resulting mixed material was injection-molded. Molding conditions are shown below.

Molding temperature: 230° C.
Screw speed: 188 rpm
Back pressure: 2.5 MPa
Injection rate: 390$cm^3$/sec (the shear rate was 2080 $sec^{-1}$)
Mold temperature: 54° C.
Cooling time: 30 sec The resulting molded part was evaluated for weight, silver streak and sink mark. The results are shown in Table 1.

Example 2

This example is the same as Example 1 except that the mold temperature was changed to 81° C.

The resulting molded part was evaluated for weight, silver streak and sink mark. The results are shown in Table 1.

Comparative Example 1

This example is the same as Example 1 except that the injection rate during the molding was changed to 195 $cm^3$/sec (the shear rate was 1040 $sec^{-1}$).

The resulting molded part was evaluated for weight, silver streak and sink mark. The results are shown in Table 1.

Comparative Example 2

This example is the same as Example 1 except that the molding temperature during the molding was changed to 180° C.

The resulting molded part was evaluated for weight, silver streak and sink mark. The results are shown in Table 1.

TABLE 1

| | Resin temperature (° C.) | Injection rate (cc/sec) | Shear rate ($sec^{-1}$) | Product weight (g) | Expansion ratio (time) | Silver streak | Sink mark |
|---|---|---|---|---|---|---|---|
| Example 1 | 230 | 390 | 2080 | 106 | 1.15 | ○ | ○ |
| Example 2 | 230 | 390 | 2080 | 106 | 1.15 | ○ | ○ |
| Comparative Example 1 | 230 | 195 | 1040 | 106 | 1.15 | x | ○ |
| Comparative Example 2 | 180 | 390 | 2080 | 108 | 1.13 | ○ | Δ |

[Series 2]

In each of the Examples and Comparative Example shown below, FS160S25ASEN (manufactured by NISSEI PLASTIC INDUSTRIAL CO., LTD.; using a shut-off nozzle) was used as an injection-molding machine and an injection-molded article (350 mm by 90 mm by 25 mm) illustrated in FIG. 1 was obtained. The portions other than ribs had a thickness of 3.0 mm. The thickness of the ribs was 1.4 mm at their roots and 1.0 mm at their tips. The height of the ribs was 25 mm. Each product had a width of 12.5 cm and thickness of 0.3 cm at its portion other than the ribs when being cut along a section of the mold cavity perpendicular to the flow direction.

Example 3

Polypropylene resin, a master batch of a foaming agent and a master batch of a pigment were dry-blended in a blend ratio of 100/2.0/0.5 (parts by weight/parts by weight/part by weight). The resulting mixed material was injection-molded. Molding conditions are shown below.

Molding temperature: 230° C.

Screw speed: 188 rpm

Back pressure: 2.5 MPa

Injection rate: 195 $cm^3$/sec

Mold temperature: 81° C.

Cooling time: 30 sec

The resulting molded part was evaluated for weight, silver streak and sink mark. The results are shown in Table 2.

Example 4

This example is the same as Example 3 except that the injection molding machine was changed to IS650E (manufactured by TOSHIBA MACHINE Co., Ltd.; using a shut-off nozzle) and the injection rate was changed to 390 $cm^3$/sec.

The resulting molded part was evaluated for weight, silver streak and sink mark. The results are shown in Table 2.

Comparative Example 3

This example is the same as Comparative Example 3 except that the mold temperature was changed to 54° C.

The resulting molded part was evaluated for weight, silver streak and sink mark. The results are shown in Table 2.

Comparative Example 4

This example is the same as Comparative Example 3 except that the molding temperature was changed to 180° C.

The resulting molded part was evaluated for weight, silver streak and sink mark. The results are shown in Table 2.

TABLE 2

| | Mold temperature (° C.) | Product weight (g) | Silver streak | Sink mark |
|---|---|---|---|---|
| Example 1 | 81 | 107 | ○ | ○ |
| Example 2 | 81 | 106 | ○ | ○ |
| Comparative Example 1 | 54 | 106 | x | ○ |
| Comparative Example 2 | 54 | 108 | ○ | Δ |

[Series 3]

In each of the Examples and Comparative Example shown below, IS650E (manufactured by TOSHIBA MACHINE Co., Ltd.; using a shut-off nozzle) was used as an injection-molding machine and an injection-molded article (350 mm by 90 mm by 25 mm) illustrated in FIG. 1 was obtained. The portions other than ribs had a thickness of 3.0 mm. The thickness of the ribs was 1.4 mm at their roots and 1.0 mm at their tips. The height of the ribs was 25 mm. The intervals of the ribs were 20 mm. Each product had a width of 12.5 cm and thickness of 0.3 cm at its portion other than the ribs when being cut along a section of the mold cavity perpendicular to the flow direction. Letting Q ($cm^3$/sec) denotes the injection rate, the shear rate was $6\times Q\div(12.5\times 0.3^2)=5.33\times Q$ ($sec^{-1}$).

Example 5

A propylene-ethylene block copolymer (AZ161C manufactured by Sumitomo Chemical Co., Ltd.; melt flow rate=30 g/10 min), a master batch of a foaming agent and a master batch of a pigment were dry-blended in a blend ratio of 100/2.0/0.5 (parts by weight/parts by weight/part by weight). The resulting mixed material was injection-molded. Molding conditions and a parameter of the resin are shown below.

Resin temperature: 230° C.

Mold temperature: 54° C.

Cooling time: 30 sec

Injection rate: 390 $cm^3$/sec (Hence, the shear rate $\gamma$ was 2080 $sec^{-1}$.)

Melt viscosity of resin (measured with a capillary rheometer under conditions including a temperature of 230° C. and a shear rate of 2080 $sec^{-1}$): 29.9 Pa.sec.

The value of the left term of formula [*] and the results of evaluation are shown in Table 3.

Example 6

Operation were carried out in the same manner as Example 5 except that the propylene-ethylene block copolymer was changed to AH561 manufactured by Sumitomo Chemical Co., Ltd (melting point ($M_p$)=164° C.; melt flow rate=3 g/10 min)

Melt viscosity of resin is 58.9 Pa.sec

The value of the left term of formula [*] and the results of evaluation are shown in Table 3.

Comparative Example 5

A propylene-ethylene block copolymer (AU561E1 manufactured by Sumitomo Chemical Co., Ltd.; melting point ($M_p$) =164° C.; melt flow rate=60 g/10 min), a master batch of a foaming agent and a master batch of a pigment were dry-blended in a blend ratio of 100/2.0/0.5 (parts by weight/parts by weight/part by weight). The resulting mixed material was injection-molded. Molding conditions and a parameter of the resin are shown below.

Resin temperature: 180° C.

Mold temperature: 54° C.

Cooling time: 30 sec

Injection rate: 195 $cm^3$/sec (Hence, the shear rate $\gamma$ was 1040 $sec^{-1}$.)

Melt viscosity of resin (measured with a capillary rheometer under conditions including a temperature of 180° C. and a shear rate of 1040 $sec^{-1}$): 57.7 Pa·sec.

The value of the left term of formula [*] and the results of evaluation are shown in Table 3.

TABLE 3

| | Left term of formula [*] | Silver streak | Sink mark |
|---|---|---|---|
| Example 1 | 590 | ○ | ○ |
| Example 2 | 715 | ○ | ○ |
| Comparative Example 1 | 422 | x | ○ |

As described in detail above, the present invention can prevent generation of sink marks and silver streaks in injection foam molding.

What is claimed is:

1. A method for manufacturing an injection-molded foamed article, the method comprising the steps of:

melt-kneading a thermoplastic resin and a chemical foaming agent in a cylinder of an injection unit, injecting the melt-kneaded thermoplastic resin from the cylinder into a cavity of a mold, and cooling and solidifying the thermoplastic resin injected in the cavity, wherein at least one of conditions (1) and (2) given below is satisfied:

$$M_p+35^\circ\text{ C.}\leqq T\leqq M_p+115^\circ\text{ C. and }\gamma\geqq 1800\text{ sec}^{-1} \quad (1)$$

wherein $M_p$ denotes the melting point (° C.) of the thermoplastic resin, T denotes the molding temperature (° C.) and $\gamma$ denotes the shear rate ($sec^{-1}$) of the thermoplastic resin during its filling into the cavity at the molding temperature T;

$$T_m\geqq M_p-105^\circ\text{ C.} \quad (2)$$

wherein $T_m$ denotes a mold temperature (° C.), and $M_p$ has the same meaning as above; and wherein condition (3) given below is satisfied:

$$150^\circ\text{ C.}\leqq M_p\leqq 180^\circ\text{ C. and }\eta\times\gamma^2\times 10^{-6}+2T\geqq 560 \quad (3)$$

wherein $M_p$, T and $\gamma$ have the same meanings as above and $\eta$ denotes the melt viscosity (Pa·sec) of the thermoplastic resin at the molding temperature T.

2. The method for manufacturing an injection-molded foamed article according to claim 1, wherein the thermoplastic resin has a melt flow rate of from 1 g/10 mm to 60 g/10 mm.

3. The method for manufacturing an injection-molded foamed article according to claim 1, wherein the thermoplastic resin is a polypropylene resin.

4. The method for manufacturing an injection-molded foamed article according to claim 3, wherein at least one of conditions (4) and (5) given below is satisfied:

$$200^\circ\text{ C.}\leqq T\leqq 280^\circ\text{ C.} \quad (4)$$

wherein T has the same meaning as above;

$$T_m\geqq 60^\circ\text{ C.} \quad (5)$$

wherein $T_m$ has the same meaning as above.

5. The method for manufacturing an injection-molded foamed article according to claim 1, wherein the chemical foaming agent is an inorganic chemical foaming agent.

* * * * *